United States Patent
Most et al.

(10) Patent No.: US 10,764,303 B2
(45) Date of Patent: Sep. 1, 2020

(54) DETECTING UNAUTHORIZED CLOUD ACCESS BY DETECTING MALICIOUS VELOCITY INCIDENTS

(71) Applicant: Microsoft Technology Licensing, LLC, Redmond, WA (US)

(72) Inventors: Yonatan Most, Kfar-Saba (IL); Shai Kaplan, Kfar-Saba (IL); Ido Bar Av, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 303 days.

(21) Appl. No.: 15/962,592

(22) Filed: Apr. 25, 2018

(65) Prior Publication Data
US 2019/0334923 A1    Oct. 31, 2019

(51) Int. Cl.
*H04L 29/06*     (2006.01)
*G06F 17/18*    (2006.01)
*H04W 12/08*    (2009.01)

(52) U.S. Cl.
CPC ............ *H04L 63/107* (2013.01); *G06F 17/18* (2013.01); *H04L 63/1416* (2013.01);
(Continued)

(58) Field of Classification Search
CPC ............... H04L 63/107; H04L 63/1416; H04L 63/1425; H04L 63/1408; H04L 63/10;
(Continued)

(56) References Cited

U.S. PATENT DOCUMENTS 5,953,652 A * 9/1999 Amin ................ H04W 12/1206
455/410
8,621,586 B1 * 12/2013 Peer ........................ H04L 63/08
726/7
(Continued)

FOREIGN PATENT DOCUMENTS

EP    3107021 A1    12/2016
EP    3133522 A1    2/2017

OTHER PUBLICATIONS

"International Search Report and Written Opinion Issued in PCT Application No. PCT/US19/028012", dated Jun. 28, 2019, 15 Pages.

*Primary Examiner* — Robert B Leung
(74) *Attorney, Agent, or Firm* — Newport IP, LLC; David W. Foster

(57) ABSTRACT

Embodiments detect unauthorized access to cloud-based resources. One technique analyzes cloud-based events to distinguish potentially malicious velocity incidents from benign velocity incidents. A velocity incident occurs when the same user causes events from two geographically remote locations in a short time. Benign velocity incidents are distinguished from malicious velocity incidents by comparing an event with past events that have the same features. Embodiments probabilistically determine if a velocity incident is malicious or benign based on a weighted multi-feature analysis. For each feature of an event, a probability is calculated based on past events that have the same feature. Then, each feature is associated with a weight based on a relative frequency of past events having that feature. A weighted average of probabilities is calculated, and the resulting probability is compared to a defined threshold to determine if the velocity incident is likely malicious or benign.

20 Claims, 11 Drawing Sheets

(52) U.S. Cl.
CPC .......... *H04L 63/1425* (2013.01); *H04L 63/10* (2013.01); *H04W 12/08* (2013.01)

(58) Field of Classification Search
CPC . G06F 17/18; G06F 2221/2111; H04W 12/08
See application file for complete search history.

(56) References Cited

U.S. PATENT DOCUMENTS

| | | | |
|---|---|---|---|
| 10,015,185 B1* | 7/2018 | Kolman | H04L 63/1425 |
| 2008/0228721 A1* | 9/2008 | Wahl | G06F 21/316 |
| 2013/0110715 A1* | 5/2013 | Buchhop | G06Q 40/02 705/42 |
| 2017/0155652 A1 | 6/2017 | Most et al. | |
| 2018/0077192 A1* | 3/2018 | Tan | H04L 63/1433 |
| 2018/0248863 A1* | 8/2018 | Kao | H04L 63/08 |

* cited by examiner

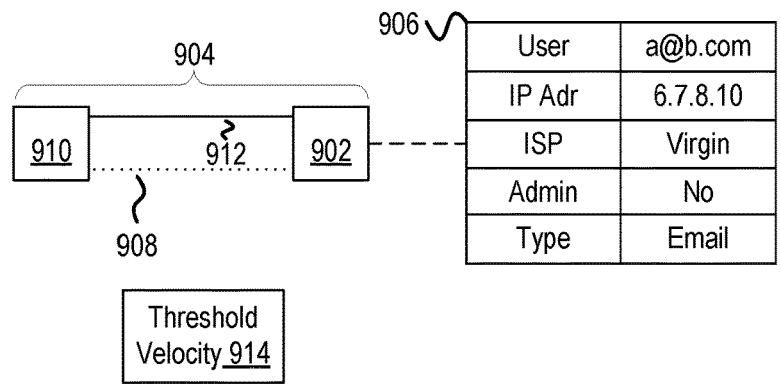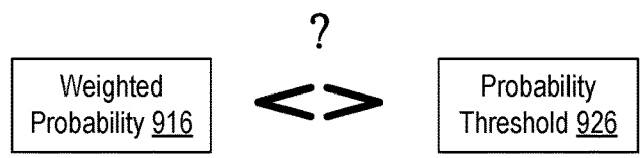
FIGURE 9

DETECTING UNAUTHORIZED CLOUD ACCESS BY DETECTING MALICIOUS VELOCITY INCIDENTS

BACKGROUND

Cloud computing is a rapidly growing industry. Cloud-based applications allow organizations to minimize up-front IT infrastructure costs while increasing accessibility. However, by making resources available on the public internet, unauthorized access is a constant concern. For example, a hacker may use stolen credentials to download emails, or a friend may use shared Netflix® credentials in violation of an end user licensing agreement.

It has proved challenging to determine when shared or stolen credentials are being used. Many events that appear unauthorized are in fact benign. Hand-written rules have proved ineffective at distinguishing legitimate use from foul play.

Detecting unauthorized access to cloud-based resources is a technological problem in the software arts, not an abstract idea for which computers are invoked as a tool. One technological challenge to distinguishing malicious events from benign events is the ability of people to mimic being in different places around the world via virtual private networking (VPN). VPNs, and other techniques for remotely controlling a computing device, enable a person to legitimately appear to be in two places at once. Other challenges include distinguishing unauthorized access from autonomous bots and other scenarios in which cloud access appears to be caused by different people but is in fact caused by an agent on behalf of a user.

It is with respect to these and other technological challenges that the disclosure made herein is presented.

SUMMARY

Embodiments detect unauthorized access to cloud-based resources. One technique analyzes cloud-based events to distinguish malicious velocity incidents from benign velocity incidents. Events include logins, file downloads, sending an email, or other activities. A velocity incident occurs when the same user (e.g. the same online credentials, persona, etc.) performs activity from two geographically remote locations in a short time. A benign velocity incident occurs when there is an explanation how a single person could cause two events so close in time given their geographic distance. A malicious velocity incident occurs when there is no explanation how a single person was able to physically generate both events in their respective geographic locations. For example, a malicious velocity incident would occur when an account owner logs in from London and 15 minutes later a hacker in New Jersey uses stolen credentials to log into the same account.

If events were taken at face value, i.e. as generated at their purported physical locations by the purported account owner, all velocity incidents would be malicious. However, there are scenarios where a person may cause events in two places at once, such as using a virtual private network (VPN) to log into a geographically distant computer. Events performed autonomously on behalf of a person may also create a benign velocity incident. For example, in response to a person uploading a photo while traveling abroad, a bot on the person's home computer may autonomously download the photo, triggering a benign velocity incident.

In some embodiments, distinguishing malicious from benign velocity incidents includes comparing one of the events of the incident with past events that have the same features. Features may include, for example, username, internet service provider (ISP), internet protocol (IP) address, etc. In some embodiments, malicious velocity incidents are rare, so events associated with frequently occurring features may be considered benign.

However, it has been challenging to determine which events to use for comparisons. Ideally, a given event would be compared to past events that share all of the same features, e.g. username, ISP, IP address, etc. More commonly, past events will share some but not all features, e.g. some past events may share a username, others will share an IP address, while others will share both.

To address these challenges, embodiments probabilistically determine if a velocity incident is benign based on a weighted multi-feature analysis. In some embodiments, for each feature of an event, a probability is calculated based on past events that have the same feature. For example, for each feature associated with an event, embodiments calculate the probability that, given it has that feature, the event is part of a velocity incident.

Then, each feature is associated with a weight based on a relative frequency of past events having that feature. For example, features associated with more past events are given greater weight than features associated with fewer past events. A weighted average of probabilities is calculated, and the resulting probability is compared to a defined threshold to determine if the velocity incident triggers a security warning.

The techniques disclosed herein improve cloud computer security. By overcoming the technological challenges posed by VPNs, bots, and other ways in which a velocity incident may be benign, a more accurate understanding of security threats is achieved. Other technical effects other than those mentioned herein can also be realized from implementations of the technologies disclosed herein.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 9 illustrates aspects of the techniques disclosed herein.

DETAILED DESCRIPTION

Figure 1:
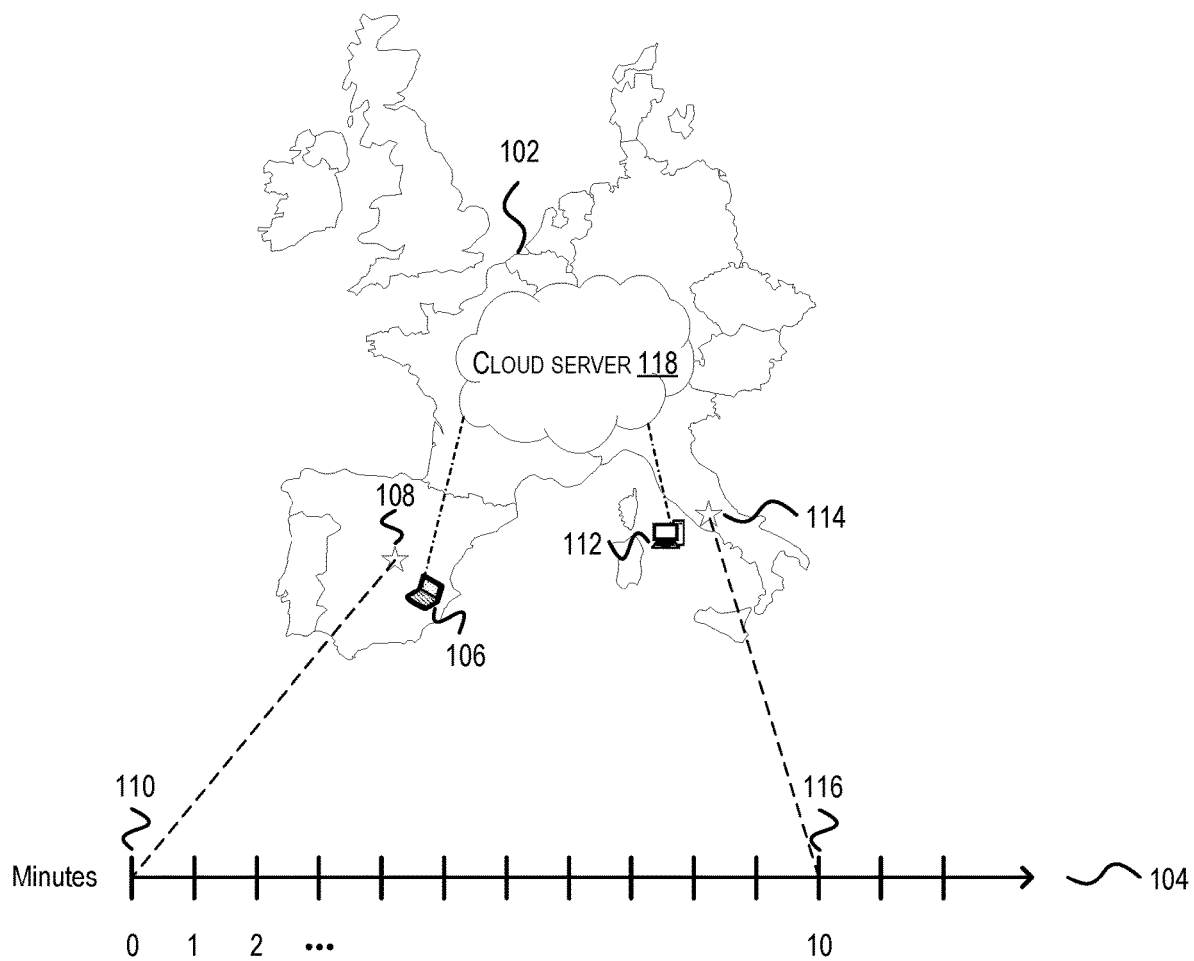
FIG. 1 illustrates a system in which a velocity incident takes place.

FIG. 1 illustrates a system 100 in which a velocity incident takes place. A velocity incident occurs when the same user (but not necessarily the same physical person) performs activity from two geographically remote locations in a short time, i.e. less time than it would take for a person to travel between the two locations. A user refers to an online persona, credential, or other means of digital identity, while a person refers to a physical human being.

In some embodiments, map 102 represents real world locations where the events of a velocity incident take place, while timeline 104 represents when the events take place. Computing device 106, geographically located at location 108 (e.g. Madrid, Spain), performs an event with cloud server 118 at time 110. 10 minutes later at time 116, computing device 112, geographically located at location 114 (e.g. Rome, Italy), performs a second event with cloud server 118.

A velocity incident may be detected by determining a geographic distance between locations 108 and 114, calculating a minimum amount of time it would take a person to travel between these locations, and comparing the calculated amount of time to the actual elapsed time. If both events are performed by the same user, and the actual elapsed time is less than the calculated minimum amount of time, a velocity incident has occurred.

Figure 2:
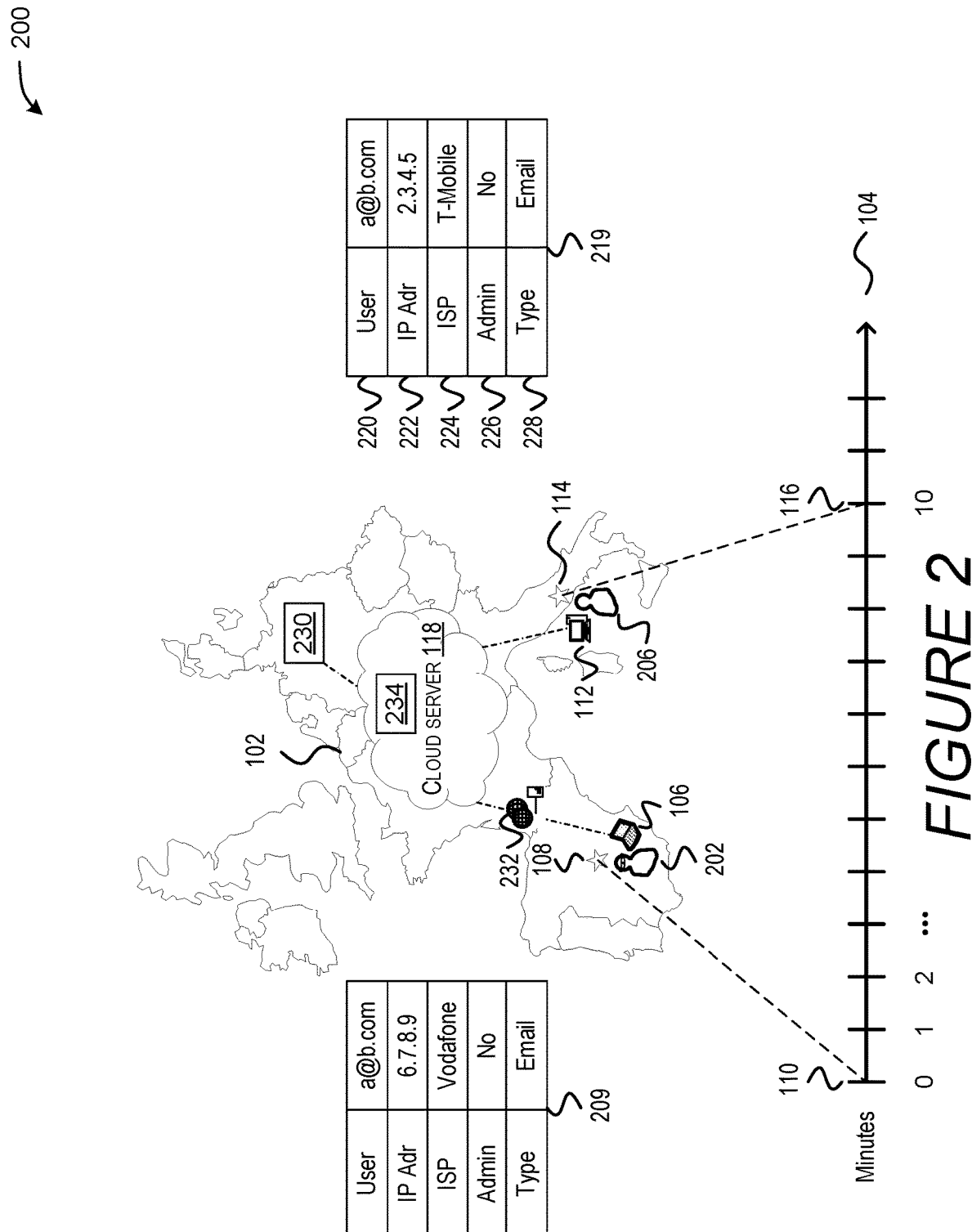
FIG. 2 illustrates a system in which a malicious person is causing a velocity incident.

FIG. 2 illustrates a system 200 in which a malicious person is causing a velocity incident. In some embodiments, malicious person 202, physically located in Madrid (location 108) and operating computing device 106, initiates an event with cloud server 118 at time 110. Malicious person 202 performs the event as user a@b.com, which may be a stolen or shared credential. The event is associated with a list of features as indicated by table 209, which includes user name 210 (a@b.com), IP address 212 (6.7.8.9), Internet service provider (ISP) 214 (Vodafone), whether the event is associated with an administrative action 216 (No), and the event type 218 (Email).

10 minutes later, person 206 uses computing device 112 at Rome (location 114) to perform an event with cloud server 118. 10 minutes is but one example—any amount of time less than a calculated minimum travel time between locations 108 and 114 is similarly contemplated. Also, while person 206 is depicted as performing the event after malicious person 202 performed their event, a velocity incident may also detected if person 206 generates an event before malicious person 202. In some embodiments, the event generated by person 206 has attributes listed in table 219, including user name 220 (a@b.com), IP address 222 (2.3.4.5), ISP 224 (T-Mobile), whether the event is associated with administrative action 226 (No), and the event type 228 (Email).

In some embodiments, events are captured in real time by routing traffic through proxy server 232. In this embodiment, events may be captured by proxy server 232 and forwarded to event processing engine 230 in real time. However, instead of forwarding events in real time, proxy server 232 may also batch events for processing by event processing engine 230. Additionally or alternatively, event processing engine 230 may retrieve events from logs 234 that were captured and maintained by the cloud-based application itself.

Figure 3:
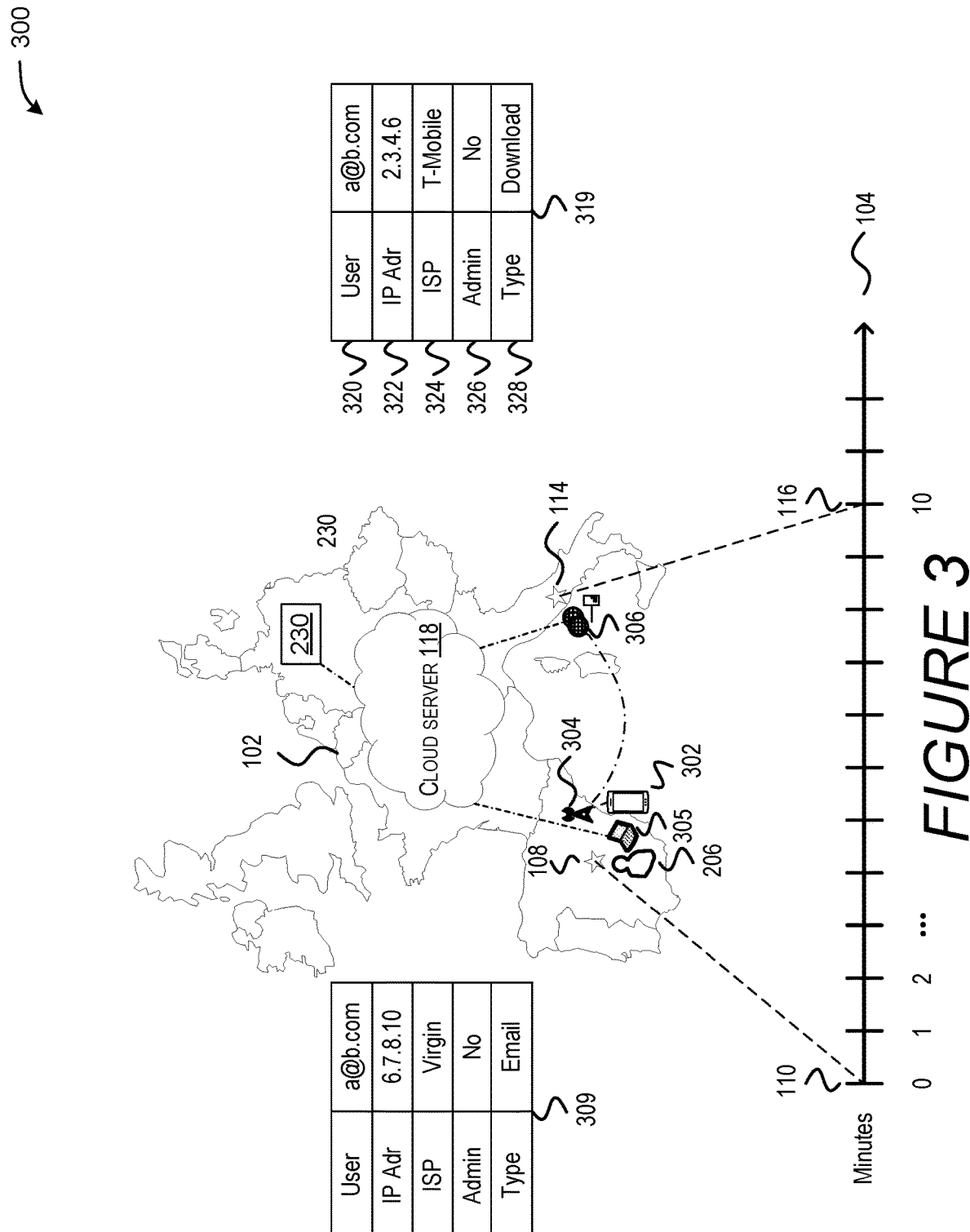
FIG. 3 illustrates a system in which a benign velocity incident is caused by a roaming cell phone retaining an IP address from its country of origin.

FIG. 3 illustrates a system 300 in which a benign velocity incident is caused by a roaming cell phone retaining an IP address from its country of origin. In some embodiments, person 206, who lives in Rome, has traveled to Madrid with mobile phone 302 and computing device 308. Person 206 uses both devices within a short period of time to cause events at cloud server 118. For example, person 206 sends an email from computing device 308 causing an event with attributes listed in table 309: user name 310 (a@b.com), IP address 312 (6.7.8.10), ISP 314 (Virgin), whether the event is associated with administrative action 316 (No), and the event type 318 (Email). Around that time (e.g. 10 minutes later), person 206 downloads a file to mobile phone 302 causing an event with attributes listed in table 319: user name 320 (a@b.com), IP address 322 (2.3.4.6), ISP 324 (T-Mobile), whether the event is associated with administrative action 326 (No), and the event type 328 (Download).

Some mobile phones retain an IP address from their country of origin, even when roaming to other countries. While a mobile phone is used for illustrative purposes, any device that connects to the Internet over a mobile network is similarly contemplated, such as a tablet, personal digital assistant (PDA), internet of things (IoT) device, or the like. For example, mobile phone 302 may connect to cell tower 304 in Spain, which may route traffic through proxy server 306 in Italy, thereby retaining an IP address from Italy for mobile phone 302. However, by retaining the IP address from Italy, the events caused by person 206 appear at great distance from each other (e.g. originate from different countries), causing event processing engine 230 to detect a velocity incident.

Figure 4:
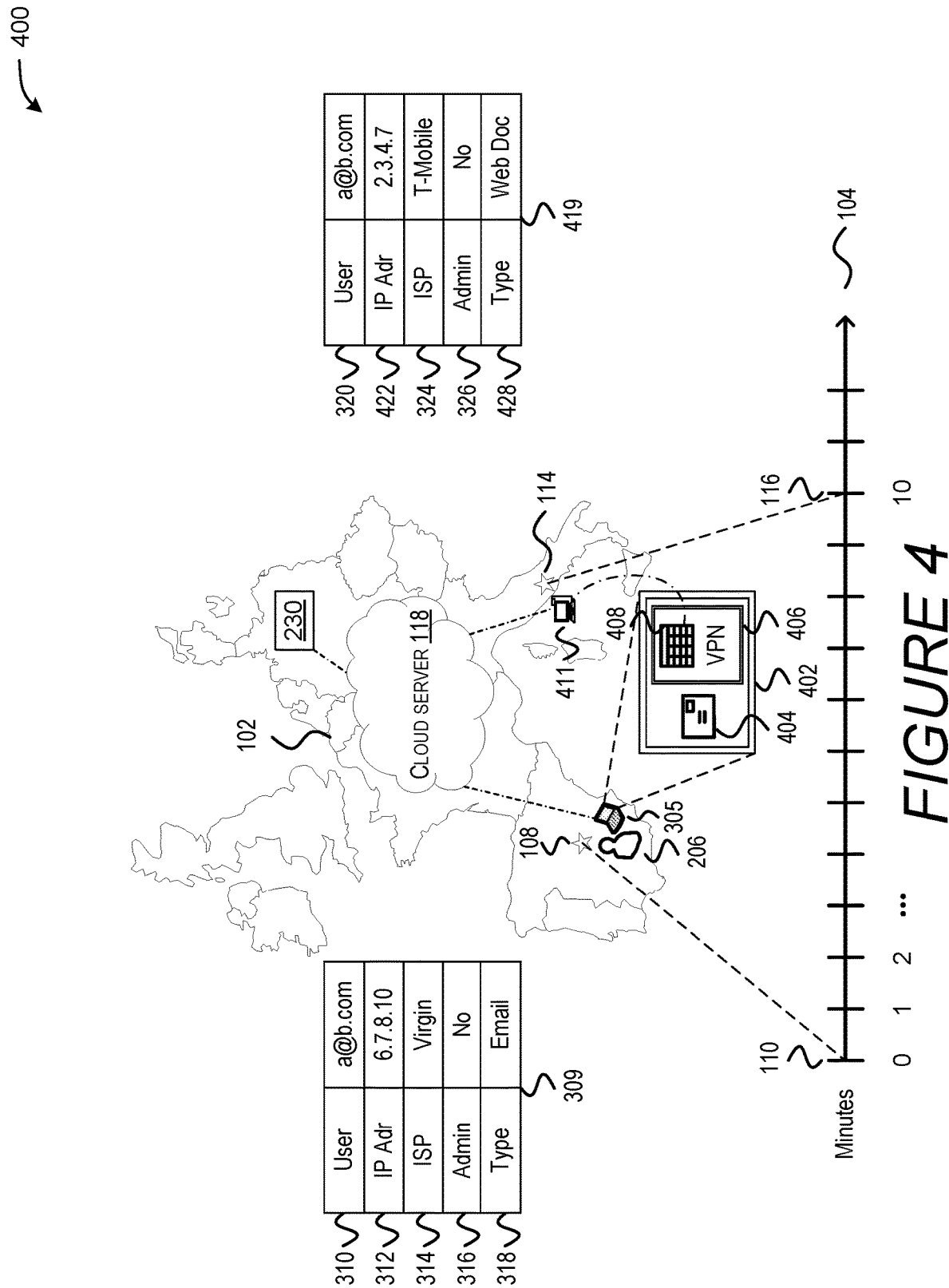
FIG. 4 illustrates a system in which a benign velocity incident is caused by a virtual private network (VPN) session.

FIG. 4 illustrates a system 400 in which a benign velocity incident is caused by a virtual private network (VPN) session. In some embodiments, person 206 operates computing device 305 having display screen 402. Person 206 may be sending an email 404 while using VPN 406 to edit spreadsheet 408 on computing device 411 (other embodiments in which VPN 406 executes on a different computing device is similarly contemplated). The email event is associated with features listed in table 309, as discussed above in conjunction with FIG. 3, while the spreadsheet editing event is associated with features listed in table 419, including IP address 422 (2.3.4.7) and event type 428 (Web Doc).

Because computing device 411 is located in Italy, events related to editing spreadsheet 408 are associated with an Italian IP address (e.g. IP address 422 of table 419), even though person 206 is performing both tasks from the same computing device 305 in Madrid (e.g. from IP address 322: 2.3.4.6). As such, event processing engine 230 will detect a velocity incident.

Figure 5:
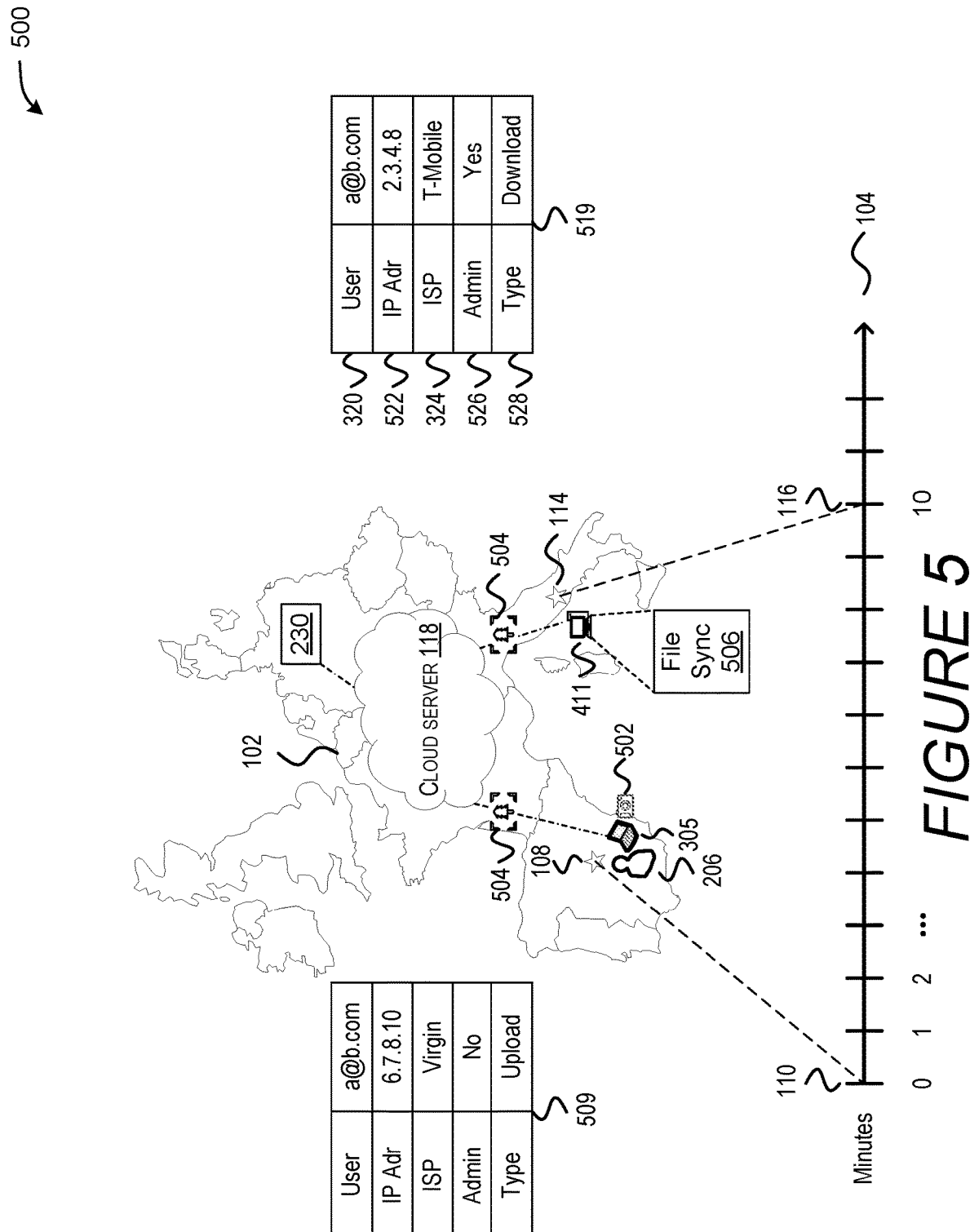
FIG. 5 illustrates a system in which a benign velocity incident is caused by a bot downloading a photo that was uploaded while the person is traveling.

FIG. 5 illustrates a system 500 in which a benign velocity incident is caused by an agent downloading a photo that was uploaded while the person is traveling. In some embodiments, person 206, while traveling to location 108 away from home 114, takes a picture 504 with camera 502. Picture 504 is uploaded to cloud server 118 (e.g. via computing device 305). This event has the features listed in table 509, including an event type 518 of "upload".

In some embodiments, computing device 411, residing in the home of person 206, is equipped with file sync agent 506. File sync agent 506 may detect or otherwise be notified that picture 504 has been uploaded to cloud server 118, and in response, initiate a download of picture 504 for local storage and viewing. This download event is associated with attributes listed in table 519, including IP address 522 (2.3.4.8), whether the event is associated with administrative action 526 (Yes), and event type 528 (download). In scenarios where file sync agent 506 is operating under the same user name as computing device 305, a velocity incident is triggered, as the time it takes to synchronize picture 504 is much less than the time it would take person 206 to travel between location 108 and 114.

The download event is an administrative action because the event is triggered by an autonomous agent on behalf of person 206, without being caused by person 206 directly manipulating computing device 411. Other types of administrative events are similarly contemplated, including those that are not performed in response to a file upload or other action taken directly by person 206, as discussed below in conjunction with FIG. 7.

Figure 6:
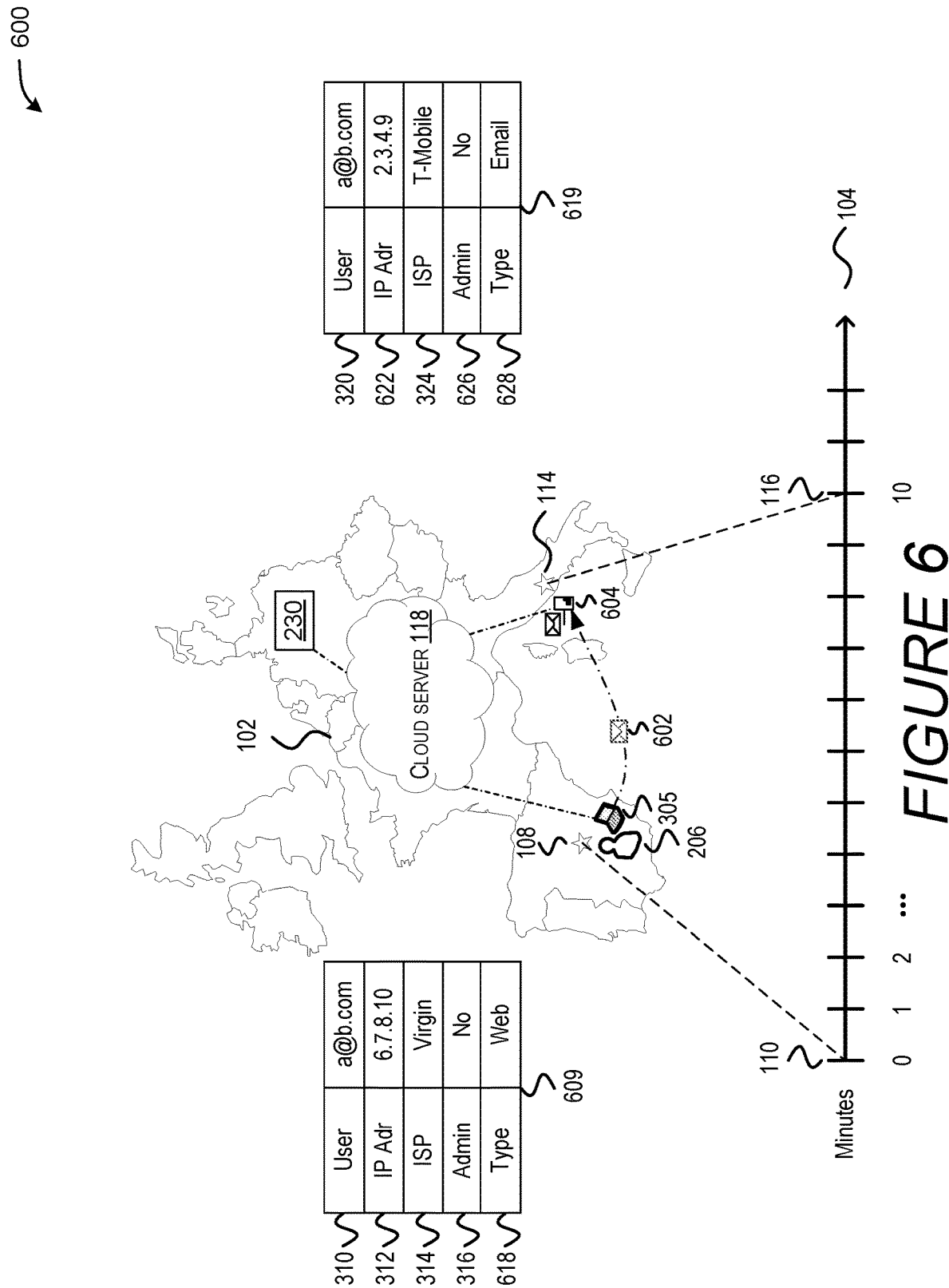
FIG. 6 illustrates a system in which a benign velocity incident is caused by an email being sent by a server computer.

FIG. 6 illustrates a system 600 in which a benign velocity incident is caused by an email being sent by a server computer. In some embodiments, person 206 uses computing device 305 to perform two events: browsing a website and sending an email. The web browsing event is associated with features listed in table 609, including event type 618 of "Web". The email event is associated with features listed in table 619, including IP address 622 (2.3.4.9).

While both events originate on computing device 305, the email will actually be sent by email server 604, which may be a significant distance away from computing device 305. As such, the email will be associated with the IP address of email server 604, not the IP address of computing device 305. As such, the web browsing event and the email event will be detected as a velocity incident by event processing engine 230.

Figure 7:
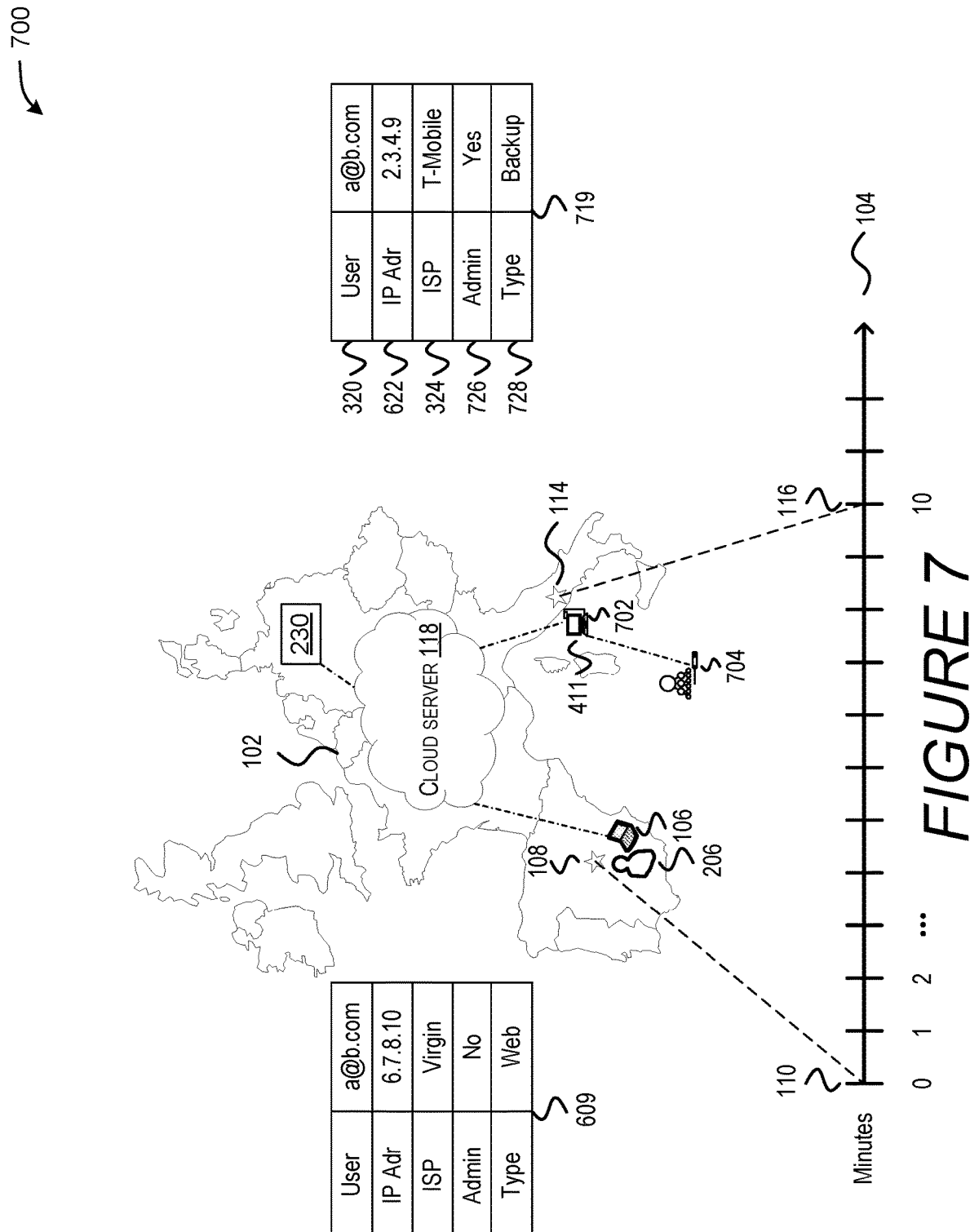
FIG. 7 illustrates a system in which a benign velocity incident is caused by a bot performing administrative work while the user is away.

FIG. 7 illustrates a system 700 in which a benign velocity incident is caused by a bot performing administrative work while the user is away. In some embodiments, bot 702 is an autonomous agent triggered periodically, e.g. to perform a backup operation on computing device 411. In other embodiments, bot 702 may be triggered by events such as reaching a certain storage capacity threshold, e.g. to perform a disk balancing operation. Bot 702 may also be triggered by administrative server 704 to perform functions such as upgrading an office suite installed on computing device 411, installing an operating system patch, or the like.

If bot 702 performs one of these operations while person 206 is traveling, and if both the bot 702 and person 206 cause events within a short enough period of time, a velocity incident will be detected by event processing engine 230.

Figure 8:
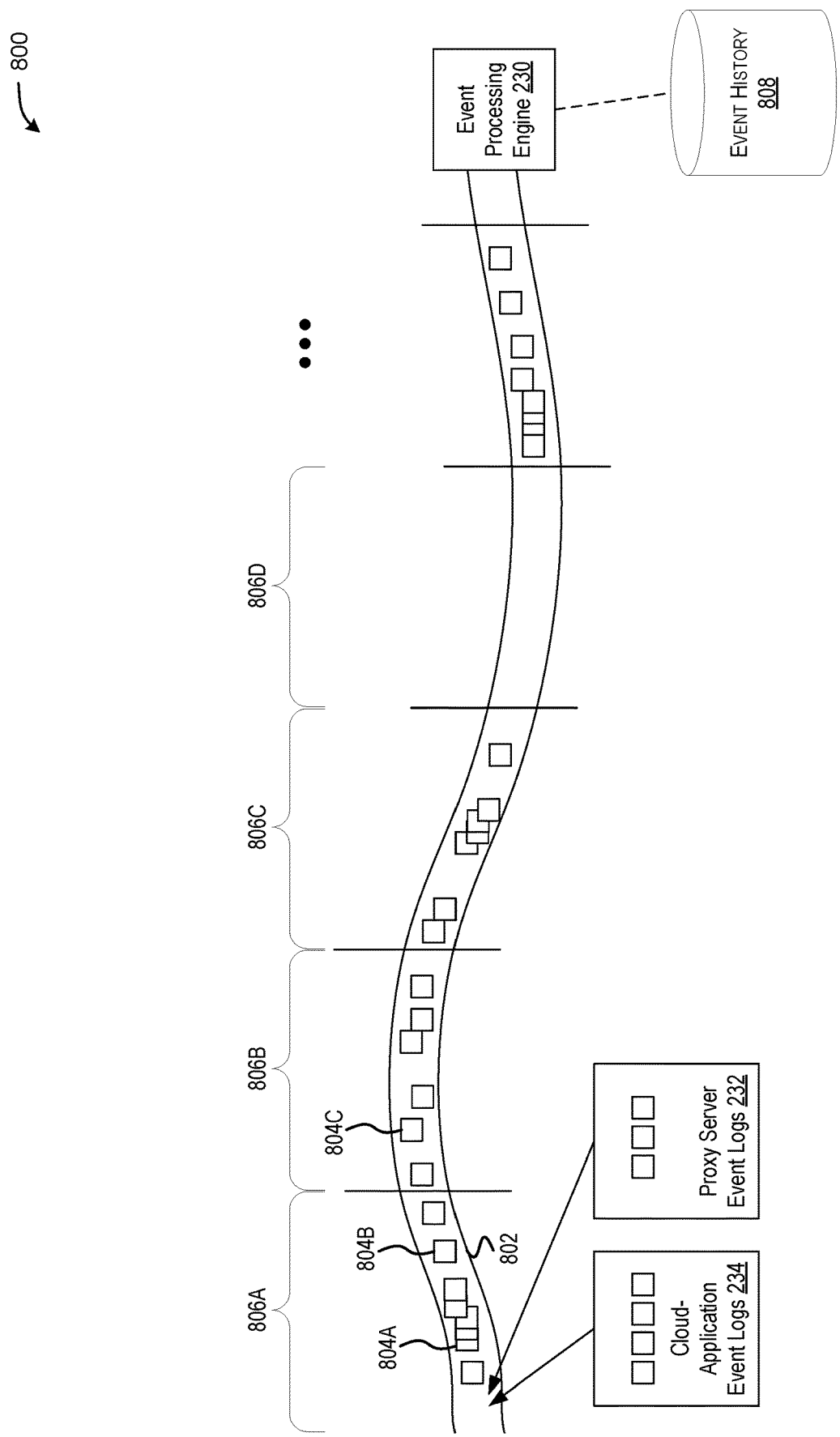
FIG. 8 illustrates a sequence of events divided into batches to determine if an event represents a malicious velocity incident.

FIG. 8 illustrates a sequence of events 800 divided into batches to determine if an event represents a malicious velocity incident or a benign velocity incident. In some embodiments, event stream 802 represents a series of events (e.g. events 804 *a*, 804B, 804C . . . ). Each event may be associated with one or more features, as depicted in tables 309, 319, etc. Events may be supplied by cloud-application event logs 234 and/or proxy server 232, and consumed by event processing engine 230. In some embodiments, event processing engine 230 calculates probabilities that events are malicious or benign by comparison to previously recorded events having one or more features in common. Previously recorded events may be stored in event history 808.

In some embodiments, event stream 802 is divided into segments, such as segments 806A-D. Malicious or benign velocity events may then be identified based on calculations performed on other events in the segment. In this way, a balance is struck limiting the computational requirements to perform the calculation while allowing enough events for the calculation to be relevant. Comparing events within a segment also serves to ensure the comparison is against relevant (e.g. not outdated) data. Segments may be minutes or hours long, depending on the frequency of events, available processing power, and accuracy requirements. However segments of any length are similarly contemplated, such as seconds, days, or longer.

FIG. 9 illustrates aspects of the techniques disclosed herein. In some embodiments, event 902 of velocity incident 904 is associated with features 906. Event 902 may have occurred (i.e. have been caused by a computing device at) a distance 908 from the other event 910 of velocity incident 904. An amount of time 912 may have elapsed between event 902 and event 910. In some embodiments, a velocity calculated based on the distance 908 and the amount of time 912 (e.g. by dividing distance 908 by amount of time 912) may be compared to velocity threshold 914 to determine that events 902 and 910 constitute a velocity incident.

In some embodiments, weighted probability 916 is calculated in part by summing 918, for each feature 906 of event 902, a product of a probability 920 and a relative frequency 922. The resulting sum is then divided by a sum 924 of the relative frequencies 922. In some embodiments, the probability 920 is calculated based on features of events stored in event history 808 as described below in conjunction with operation 1003 of FIG. 10. In some embodiment, the relative frequency 922 is calculated based on features of events stored in event history 808 as discussed below in conjunction with operation 1005 of FIG. 10.

In some embodiments, weighted probability 916 is compared to probability threshold 926 to determine if velocity incident 904 is malicious or benign.

Figure 10:
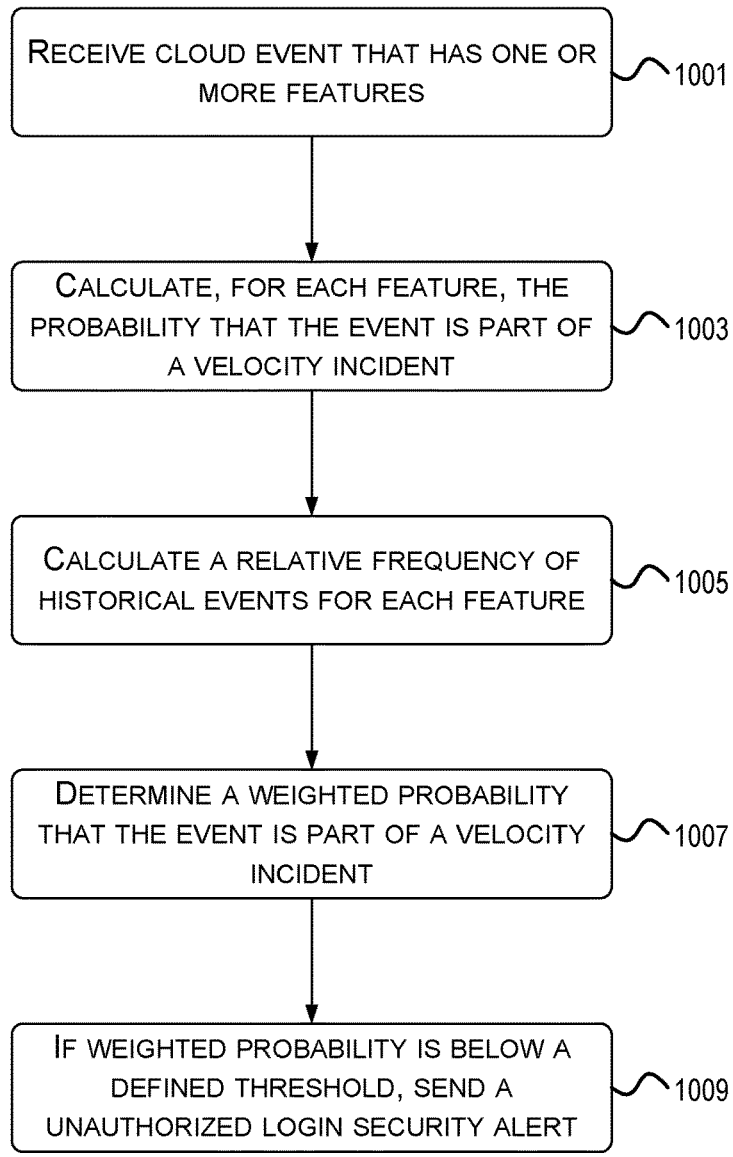
FIG. 10 illustrates aspects of a routine for enabling aspects of the techniques disclosed herein as shown and described below.

FIG. 10 illustrates aspects of a routine 1000 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 1000 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 1000 may be also implemented in many other ways. For example, the routine 1000 may be implemented, at least in part, by a processor of another remote computer or a local circuit. In addition, one or more of the operations of the routine 1000 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Routine 1000, which in some embodiments is implemented by event processing engine 230, begins at operation 1001, where a cloud event associated with one or more features is received. While events are described herein with reference to the cloud, other types of computing resources are similarly contemplated, including web services, client/server, or the like. In some embodiments, the received event is one of a pair of events constituting a velocity incident, as determined by comparing an amount of time elapsed between the events to a minimum amount of time required to travel between where the events originated. In some embodiments, a location of each event is approximated by an IP address feature associated with the event, although a global positioning system (GPS) based location or other means of identifying a location are similarly contemplated. In one example, it is assumed that an individual may not travel more than 500 miles per hour, i.e. the speed of commercial air travel, and as such the velocity threshold would be 500 mph. For instance, events located 2,500 miles apart, such as uploading a file from San Francisco and reading an email from New York, constitute a velocity incident if they are associated with the same user and if they occur within less than 5 hours of each other.

In some embodiments, each event is associated with one or more features, such as username, IP address, ISP, whether or not the event is performed by an administrative account, the type of event (download, upload, email, etc.), and the like. One of the features, username, is typically the same when two events constitute a velocity incident while another feature, IP address, is typically different. However, other features may or may not be shared between the pair of events.

As discussed above in conjunction with FIG. 8, in some embodiments, cloud events are received by event processing engine 230 as a stream. The stream may be divided into segments, defined by an amount of time elapsed or a number of events received. Events may be analyzed in the context of a segment. For example, probabilities that features of an event suggest a velocity incident may be weighted based on other events in the segment. In this way, resources used to calculate the probabilities are optimized and balanced against accuracy and volume. At the same time, probabilities based on events from the same segment may be more accurate than probabilities based on events that are days, weeks, months, or years old.

Next, at operation 1003, in some embodiments, for each feature of the event, the probability that the event is part of a velocity incident is calculated. In some embodiments, the probability that an event is part of a velocity incident is represented by the expression $p(x|v)*p(v)/p(x)$. Each of the terms $p(x|v)$, $p(v)$, and $p(x)$ may be calculated from historical event data, e.g. data stored in event history 808, data from the event's segment (e.g. segment 806B), or the like.

In some embodiments, $p(x|v)$ refers to the probability that an event has a particular feature given the event is part of a velocity incident. For example, given that an event is part of a velocity incident, what is the probability it has an ISP of T-Mobile®? In some embodiments, this probability is calculated by dividing a number events from T-Mobile that were part of velocity incidents by a total number of velocity events.

In some embodiments, $p(v)$ refers to the probability that an event is part of a velocity incident. In some embodiments, $p(v)$ is calculated by dividing a number of events that are part of a velocity incident by a total number of events, including events that are not part of velocity incidents.

In some embodiments, $p(x)$ refers to the probability that an event is associated with the particular feature. For example, $p(x)$ may be calculated by dividing a number of events having the particular feature by the total number of events.

For example, if out of 100,000 events, 5,000 were from T-Mobile®, then $p(x)=0.05$, while if 2,000 of the 100,000 events are part of velocity incidents, then $p(v)=0.02$. Then, if 200 of the 2,000 events associated with velocity incidents are from T-Mobile®, $p(x|v)=0.10$. Combining the terms, $p(x|v)*p(v)/p(x)=(0.02)*(0.1)/(0.05)=0.04$, meaning that a velocity incident has happened 4% of the time when the ISP was T-Mobile®.

Next, at operation 1005, in some embodiments, for each feature of the event, a probability described in operation 1003 is calculated and the results are weighted by a relative frequency of events having the feature. By weighting probabilities by relative frequencies, features for which more is known (because there is a larger number of events having that feature) are given more weight in determining whether a velocity incident has occurred.

For example, a relative frequency of particular feature x of feature i may be calculated by $n_x \cdot n_i/N$ where $n_x$ is the number of events with particular feature x, $n_i$ is the number of unique values of the feature i, and N is the total number of past events. Continuing the example, assuming that T-Mobile® is one of 4 ISPs, then a relative frequency of the ISP T-Mobile® would be calculated as $n_x \cdot n_i/N=(5,000)*(4)/(100,000)=0.20$.

Next, at operation 1007, in some embodiments, once probabilities $p_i$ and weightings $c_i$ have been calculated for each feature i, the probability that an event is part of a velocity incident may be calculated by the expression: $\Sigma_i(c_i p_i)/\Sigma_i(c_i)$. In other words, a weighted average of probabilities that a velocity incident has occurred given an event has feature i may be calculated by summing the product of each probability and the corresponding weighting and dividing by the sum of the weightings.

Next, at operation 1009, a determination is made whether an event is part of a malicious velocity incident or a benign velocity incident by comparing the weighted probability calculated in operation 1007 to a defined threshold. In some embodiments, when the weighted probability is less than the defined threshold, a determination is made that the event is part of a malicious velocity incident, while when the weighted probability is greater than the defined threshold, a determination is made that the event is part of a benign velocity incident.

In some embodiments, when the determination is made that the velocity incident is malicious, an alert is sent indicating an unauthorized login (or other unauthorized cloud event) may have occurred. In some embodiments, the alert is sent based on the weighted probability being less than the defined threshold because commonly occurring events tend not to be malicious velocity incidents, while rare events are more likely to indicate foul play. For example, a virtual private network (VPN), a benign cause of velocity incidents, may frequently cause cloud events to originate from a particular IP address or a particular range of IP addresses. In contrast, malicious velocity incidents tend to be rare—e.g. a hacker may log into an email account and downloading a user's contacts and message history a handful of times.

Even so, there are scenarios in which a rare event may be benign. For example, if a user is traveling, but their spouse needs access to a password protected file, the user may give their spouse the password over the phone, enabling him or her to access the file. This situation may be rare, or even just happen the once, but is clearly not malicious. Similarly, events may happen frequently yet be malicious.

In some embodiments, the threshold probability is user defined, loaded from a configuration file, or set to a default value. Thresholds probabilities may be set particularly low, e.g. <0.002, reflecting the intuition that malicious velocity incidents are rare compared to causes of benign velocity incidents. However, this threshold may be altered to increase or decrease the likelihood that a particular event will be considered malicious.

Figure 11:
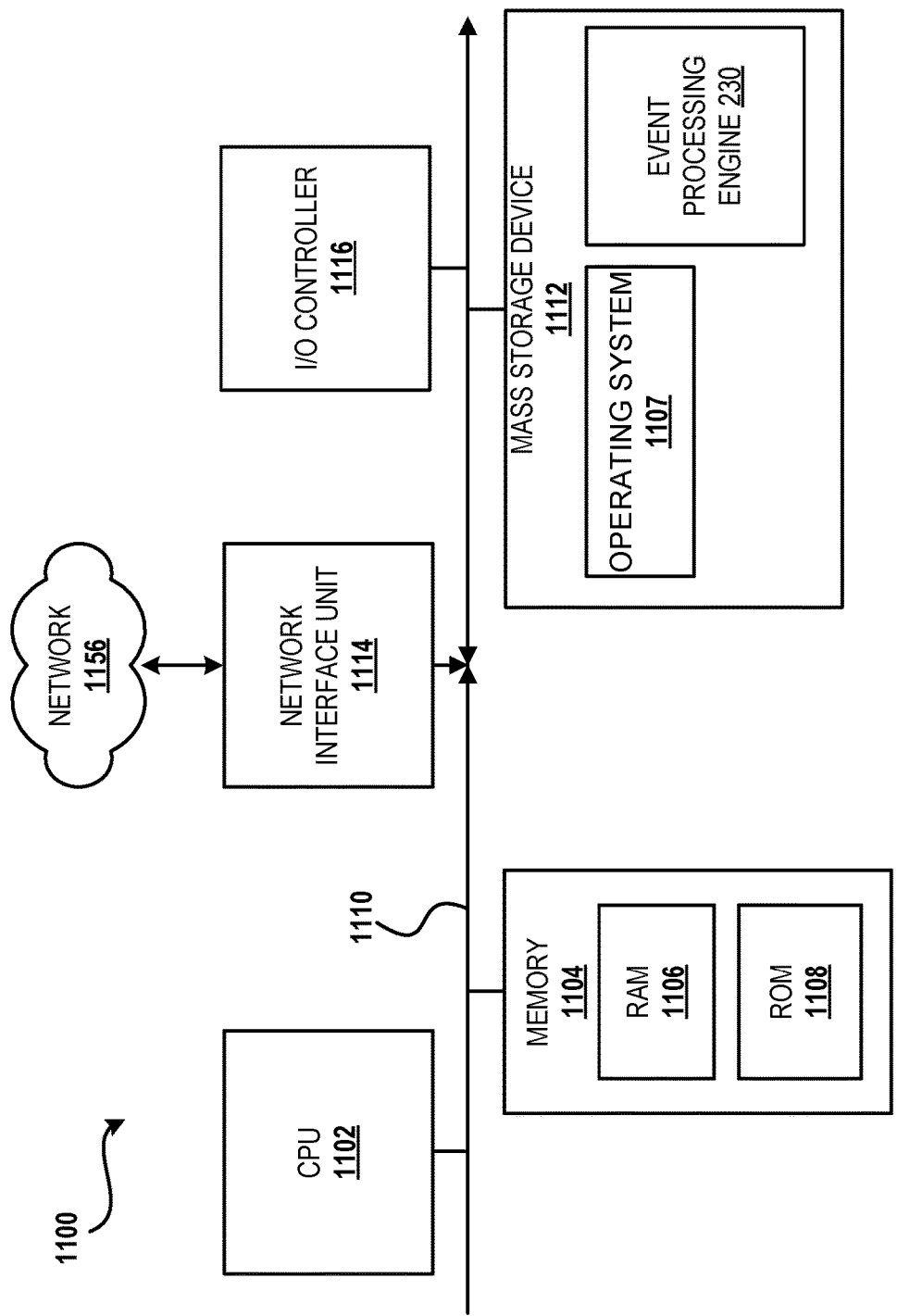
FIG. 11 is a computer architecture diagram illustrating an illustrative computer hardware and software architecture for a computing system capable of implementing aspects of the techniques and technologies presented herein.

FIG. 11 shows additional details of an example computer architecture 1100 for a computer, such as event processing engine 230 (FIG. 11), capable of executing the program components described herein. Thus, the computer architecture 1100 illustrated in FIG. 11 illustrates an architecture for a server computer, a mobile phone, a PDA, a smart phone, a desktop computer, a netbook computer, a tablet computer, and/or a laptop computer. The computer architecture 1100 may be utilized to execute any aspects of the software components presented herein.

The computer architecture 1100 illustrated in FIG. 11 includes a central processing unit 1102 ("CPU"), a system memory 1104, including a random access memory 1106 ("RAM") and a read-only memory ("ROM") 1108, and a system bus 1110 that couples the memory 1104 to the CPU 1102. A basic input/output system containing the basic routines that help to transfer information between elements within the computer architecture 1100, such as during startup, is stored in the ROM 1108. The computer architecture 1100 further includes a mass storage device 1112 for storing an operating system 1107, other data, and one or more event processing engine 230.

The mass storage device 1112 is connected to the CPU 1102 through a mass storage controller (not shown) connected to the bus 1110. The mass storage device 1112 and its associated computer-readable media provide non-volatile storage for the computer architecture 1100. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1100. For purposes of the claims, the phrase "computer storage medium," "computer-readable storage medium" and variations thereof, does not include waves, signals, and/or other transitory and/or intangible communication media, per se.

According to various configurations, the computer architecture 1100 may operate in a networked environment using logical connections to remote computers through the network 1156 and/or another network (not shown). The computer architecture 1100 may connect to the network 1156 through a network interface unit 1114 connected to the bus 1110. It should be appreciated that the network interface unit 1114 also may be utilized to connect to other types of networks and remote computer systems. The computer architecture 1100 also may include an input/output controller 1116 for receiving and processing input from a number of other devices, including a keyboard, mouse, or electronic stylus (not shown in FIG. 11). Similarly, the input/output controller 1116 may provide output to a display screen, a printer, or other type of output device (also not shown in FIG. 11).

It should be appreciated that the software components described herein may, when loaded into the CPU 1102 and executed, transform the CPU 1102 and the overall computer architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1100 in order to store and execute the software components presented herein. It also should be appreciated that the computer architecture 1100 may include other types of computing devices, including hand-held computers, embedded computer systems, personal digital assistants, and other types of computing devices known to those skilled in the art. It is also contemplated that the computer architecture 1100 may not include all of the components shown in FIG. 11, may include other components that are not explicitly shown in FIG. 11, or may utilize an architecture completely different than that shown in FIG. 11.

The disclosure presented herein also encompasses the subject matter set forth in the following clauses:

Clause 1. A computer-implemented method for identifying unauthorized cloud access by distinguishing malicious velocity incidents from benign velocity incidents, comprising: receiving an event (902) that is part of a velocity incident (904), wherein the event (902) is associated with features (906), and wherein the velocity incident (904) occurs when a distance (908) between the event (902) and another event (910) divided by a time (912) elapsed between the event (902) and the other event (910) is greater than a threshold velocity (914); determining a weighted probability (916) by: summing (918), for each feature of the event, the product of: a probability (920) that past events having the feature were part of velocity incidents, and a relative frequency (922) of past events having the feature, and dividing by a sum (924) of the relative frequencies of past events having the feature; determining the velocity incident (904) is malicious when the weighted probability is less than a defined probability threshold (926); and in response to determining the velocity incident is malicious, providing a security alert that an unauthorized cloud access event may have occurred.

Clause 2. The method of Clause 1, wherein the probability that past events having the feature were part of velocity incidents is based in part on a probability that past events that were part of past velocity incidents have the feature.

Clause 3. The method of Clause 1, wherein the probability that past events having the feature were part of velocity incidents is based in part on a probability that past events have the feature.

Clause 4. The method of Clause 1, wherein the probability that past events having the feature were part of velocity incidents is based in part on a probability that past events are part of velocity incidents.

Clause 5. The method of Clause 1, wherein the probability that past events having the feature were part of velocity incidents is based in part on multiplying a probability that past events that were part of past velocity incidents have the feature by a probability that past events have the feature and dividing by a probability that past events have the feature.

Clause 6. The method of Clause 2, wherein the probability that past events that were part of past velocity incidents have the feature is calculated by dividing a number of past events that are part of a velocity incident and that have the feature by the number of past events that are part of a velocity incident.

Clause 7. The method of Clause 3, wherein the probability that past events have the feature is calculated by dividing a number of past events that have the feature by a total number of past events.

Clause 8. The method of Clause 4, wherein the probability that past events are part of velocity incidents is calculated by dividing a number of past events that are part of velocity incidents by a total number of past events.

Clause 9. A computing device for identifying unauthorized cloud access by distinguishing malicious velocity incidents from benign velocity incidents, comprising: one or more processors; a memory in communication with the one or more processors, the memory having computer-readable instructions stored thereupon which, when executed by the one or more processors, cause the computing device to: receive an event that is part of a velocity incident, wherein the event is associated with features, and wherein the velocity incident occurs when a distance between the event and another event divided by a time elapsed between the event and the other event is greater than a threshold velocity; determine a weighted probability by: summing, for each feature of the event, the product of: a probability that past events having the feature were part of velocity incidents calculated by multiplying a probability that past events that were part of past velocity incidents have the feature by a probability that past events have the feature and dividing by a probability that past events have the feature, and a relative frequency of past events having the feature, and dividing by a sum of the relative frequencies of past events having the feature; determine the velocity incident is malicious when the weighted probability is less than a defined probability threshold; and in response to determining the velocity incident is malicious, provide a security alert that an unauthorized cloud access event may have occurred.

Clause 10. The computing device of Clause 9, wherein the threshold velocity includes a top speed of a commercial airliner.

Clause 11. The computing device of Clause 9, wherein the features include an IP address, ISP, whether the event is associated with an administrative action, or an event type.

Clause 12. The computing device of Clause 9, wherein the distance between the event and the other event is calculated based on an IP address of the event and an IP address of the other event.

Clause 13. The computing device of Clause 9, wherein a relative frequency of past events having the feature is calculated by multiplying a number of past events having the feature by a number of distinct values of the feature and dividing by a total number of past events.

Clause 14. The computing device of Clause 9, further including: determining the velocity incident is benign when the weighted probability is greater than the defined probability threshold.

Clause 15. A computer-implemented method for identifying unauthorized cloud access by distinguishing malicious velocity incidents from benign velocity incidents, comprising: receiving an event that is part of a velocity incident, wherein the event is associated with features, and wherein the velocity incident occurs when a distance between the event and another event divided by a time elapsed between the event and the other event is greater than a threshold velocity; determining a weighted probability by: summing, for each feature of the event, the product of: a probability that past events having the feature were part of velocity incidents, and a relative frequency of past events having the feature calculated by multiplying a number of past events having the feature by a number of distinct values of the feature and dividing by a total number of past events, and dividing by a sum of the relative frequencies of past events having the feature; determining the velocity incident is malicious when the weighted probability is less than a defined probability threshold; and in response to determining the velocity incident is malicious, providing a security alert that an unauthorized cloud access event may have occurred.

Clause 16. The method of Clause 15, the event is caused by an authorized person and the other event is caused by an unauthorized person.

Clause 17. The method of Clause 15, wherein the event is caused by an authorized person accessing a cloud server with a computing device and the other event is caused by the authorized person accessing the cloud server with a mobile device over a cellular network, wherein the mobile device is roaming outside of a country of origin.

Clause 18. The method of Clause 15, wherein the event is caused by an authorized person accessing a cloud server with a computing device and the other event is caused by the authorized person accessing the cloud server using a virtual private network to operate another computing device at a different location.

Clause 19. The method of Clause 15, wherein the event is caused by an authorized person uploading a file to a cloud service and the other event is caused by an autonomous agent responding to the uploading by downloading the file from the cloud service, wherein the autonomous agent is executing on another computing device at a different location, wherein the autonomous agent.

Clause 20. The method of Clause 15, wherein the event is caused by an authorized person performing a cloud service event and the other event is caused by an unrelated administrative function performed on another computing device at a different location.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method for identifying unauthorized cloud access by distinguishing malicious velocity incidents from benign velocity incidents, comprising:
receiving an event that is part of a velocity incident, wherein the event is associated with features, and wherein the velocity incident occurs when a distance between the event and another event divided by a time elapsed between the event and the other event is greater than a threshold velocity;
determining a weighted probability by:
summing, for each feature of the event, the product of:
a probability that past events having the feature were part of velocity incidents, and
a relative frequency of past events having the feature, and
dividing by a sum of the relative frequencies of past events having the feature;
determining the velocity incident is malicious when the weighted probability is less than a defined probability threshold; and
in response to determining the velocity incident is malicious, providing a security alert that an unauthorized cloud access event may have occurred.

2. The method of claim 1, wherein the probability that past events having the feature were part of velocity incidents is based in part on a probability that past events that were part of past velocity incidents have the feature.

3. The method of claim 1, wherein the probability that past events having the feature were part of velocity incidents is based in part on a probability that past events have the feature.

4. The method of claim 1, wherein the probability that past events having the feature were part of velocity incidents is based in part on a probability that past events are part of velocity incidents.

5. The method of claim 1, wherein the probability that past events having the feature were part of velocity incidents is based in part on multiplying a probability that past events that were part of past velocity incidents have the feature by a probability that past events have the feature and dividing by a probability that past events have the feature.

6. The method of claim 2, wherein the probability that past events that were part of past velocity incidents have the feature is calculated by dividing a number of past events that are part of a velocity incident and that have the feature by the number of past events that are part of a velocity incident.

7. The method of claim 3, wherein the probability that past events have the feature is calculated by dividing a number of past events that have the feature by a total number of past events.

8. The method of claim 4, wherein the probability that past events are part of velocity incidents is calculated by dividing a number of past events that are part of velocity incidents by a total number of past events.

9. A computing device for identifying unauthorized cloud access by distinguishing malicious velocity incidents from benign velocity incidents, comprising:
one or more processors;
a memory in communication with the one or more processors, the memory having computer-readable instructions stored thereupon which, when executed by the one or more processors, cause the computing device to:
receive an event that is part of a velocity incident, wherein the event is associated with features, and wherein the velocity incident occurs when a distance between the event and another event divided by a time elapsed between the event and the other event is greater than a threshold velocity;
determine a weighted probability by:
summing, for each feature of the event, the product of:
a probability that past events having the feature were part of velocity incidents calculated by multiplying a probability that past events that were part of past velocity incidents have the feature by a probability that past events have the feature and dividing by a probability that past events have the feature, and
a relative frequency of past events having the feature, and
dividing by a sum of the relative frequencies of past events having the feature;
determine the velocity incident is malicious when the weighted probability is less than a defined probability threshold; and
in response to determining the velocity incident is malicious, provide a security alert that an unauthorized cloud access event may have occurred.

10. The computing device of claim 9, wherein the threshold velocity includes a top speed of a commercial airliner.

11. The computing device of claim 9, wherein the features include an IP address, ISP, whether the event is associated with an administrative action, or an event type.

12. The computing device of claim 9, wherein the distance between the event and the other event is calculated based on an IP address of the event and an IP address of the other event.

13. The computing device of claim 9, wherein a relative frequency of past events having the feature is calculated by multiplying a number of past events having the feature by a number of distinct values of the feature and dividing by a total number of past events.

14. The computing device of claim 9, further including:
determining the velocity incident is benign when the weighted probability is greater than the defined probability threshold.

15. A computer-implemented method for identifying unauthorized cloud access by distinguishing malicious velocity incidents from benign velocity incidents, comprising:
receiving an event that is part of a velocity incident, wherein the event is associated with features, and wherein the velocity incident occurs when a distance between the event and another event divided by a time elapsed between the event and the other event is greater than a threshold velocity;
determining a weighted probability by:

summing, for each feature of the event, the product of:
   a probability that past events having the feature were part of velocity incidents, and
   a relative frequency of past events having the feature calculated by multiplying a number of past events having the feature by a number of distinct values of the feature and dividing by a total number of past events, and
   dividing by a sum of the relative frequencies of past events having the feature;
determining the velocity incident is malicious when the weighted probability is less than a defined probability threshold; and
in response to determining the velocity incident is malicious, providing a security alert that an unauthorized cloud access event may have occurred.

16. The method of claim 15, the event is caused by an authorized person and the other event is caused by an unauthorized person.

17. The method of claim 15, wherein the event is caused by an authorized person accessing a cloud server with a computing device and the other event is caused by the authorized person accessing the cloud server with a mobile device over a cellular network, wherein the mobile device is roaming outside of a country of origin.

18. The method of claim 15, wherein the event is caused by an authorized person accessing a cloud server with a computing device and the other event is caused by the authorized person accessing the cloud server using a virtual private network to operate another computing device at a different location.

19. The method of claim 15, wherein the event is caused by an authorized person uploading a file to a cloud service and the other event is caused by an autonomous agent responding to the uploading by downloading the file from the cloud service, and wherein the autonomous agent is executing on another computing device at a different location.

20. The method of claim 15, wherein the event is caused by an authorized person performing a cloud service event and the other event is caused by an unrelated administrative function performed on another computing device at a different location.

* * * * *